United States Patent
Kinoshita

(10) Patent No.: US 6,642,692 B2
(45) Date of Patent: Nov. 4, 2003

(54) CHARGE EQUALIZING DEVICE FOR POWER STORAGE UNIT

(75) Inventor: Naoki Kinoshita, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 104 days.

(21) Appl. No.: 09/884,083

(22) Filed: Jun. 20, 2001

(65) Prior Publication Data

US 2001/0054877 A1 Dec. 27, 2001

(30) Foreign Application Priority Data

Jun. 23, 2000 (JP) ........................................ 2000-190153
Jul. 19, 2000 (JP) ........................................ 2000-219392

(51) Int. Cl.[7] ................................................ H02J 7/00
(52) U.S. Cl. .................................................... 320/112
(58) Field of Search ................................ 320/112, 116, 320/132, 149, 161, 162, 133, 134, 136; 361/4, 5, 41, 56, 86, 87, 90, 91.1, 91.2; 323/291

(56) References Cited

U.S. PATENT DOCUMENTS 5,659,237 A * 8/1997 Divan et al. ................ 320/119
5,710,504 A * 1/1998 Pascual et al. .............. 320/118
5,932,932 A * 8/1999 Agatsuma et al. .......... 320/116
6,057,666 A * 5/2000 Dougherty et al. ......... 320/162
6,404,165 B1 * 6/2002 Shinpo et al. ............... 320/124

* cited by examiner

Primary Examiner—Edward H. Tso
Assistant Examiner—Pia Tibbits
(74) Attorney, Agent, or Firm—Arent Fox Kintner Plotkin & Kahn

(57) ABSTRACT

A charge equalizing device for a power storage unit, which equalizes a remaining charge of each cell unit of the power storage unit that includes a plurality of groups of cells formed by a plurality of the cell units which are connected in series. The charge equalizing device includes a connection device which connects the groups of cells in series, the connection device being capable of connecting and disconnecting the groups of cells, a connection terminal provided for each of the cell units, and a switch device which connects one of the connection terminals of one of the groups of cells to another connection terminal of the other group of cells. The switch device is capable of changing the combination of the connection terminals to be connected.

13 Claims, 9 Drawing Sheets

|  | TERMINAL VOL. (ON) | TERMINAL VOL. (OFF) |
|---|---|---|
| MAIN SWITCH | PV | ○ |
| ONE OF GROUP A SWITCH | PV/2 | ○ |
| ONE OF GROUP B SWITCH | PV/2+ 1 CELL VOL. | ○ |

BATTERY VOL. = PV

CHARGE EQUALIZING DEVICE FOR POWER STORAGE UNIT

BACKGROUND OF THE INVENTION

1. Field of the Invention

The present invention relates to a charge equalizing device for a power storage unit. More specifically, the present invention relates to a charge equalizing device which equalizes disparities in the state of charge (SOC; the remaining charge) among the secondary cells of a power storage unit that includes a plurality of secondary cells which are connected in series or series-parallel.

2. Description of Related Art

In an electrical vehicle (EV) or a hybrid electrical vehicle (HEV), it is generally required to use a high voltage battery in which a plurality of battery cells (hereinafter also referred to as cells) are connected in series. If such a battery is used for a certain period of time while repeatedly discharging and recharging the battery, or if it is left unused for a long time, disparities in the discharging-recharging efficiency of each cell forming the battery may occur. Also, depending on the differences in the environmental temperature to which the cells are exposed, disparities in the remaining charge (hereinafter also referred to as SOC disparities) of each cell may arise.

As for the charging and discharging processes for the battery, it is necessary, from the viewpoint of durability of each cell or for protection of the battery, to stop the charging process when the SOC value (or cell voltage) of the cell having the highest SOC value (or cell voltage) at that moment reaches the predetermined upper limit, and to terminate the discharging process when the SOC value (or cell voltage) of the cell having the lowest SOC value (or cell voltage) at that moment reaches the predetermined lower limit. Therefore, the usable charge of the battery is substantially decreased if disparities in the charging capacities of individual cells occur. For this reason, a so-called assist-regeneration process in which battery energy supplements gasoline power on uphill stretches and energy is regenerated for the battery on downhill stretches becomes insufficient in HEV's. Accordingly, the actual vehicle power performance decreases or the fuel consumption of the vehicle increases.

In order to solve the above-mentioned problems, a means for equalizing the SOC disparities of each cell and ensuring a suitable usable charging capacity of the battery becomes necessary. Moreover, for an energy storage member, such as a lithium ion battery or a super-capacitor, in which the charging-discharging efficiency does not change until it enters its overcharge region, an additional system for carrying out an equalizing process becomes essential.

As a method for performing the equalizing process for each cell, a so-called bypass circuit method in which a bypass circuit having a voltage sensor, a bypass resistance, and a bypass switch is provided for each cell and the bypass switch is controlled by using a microcomputer, has been proposed and actually implemented for vehicles such as HEV's.

FIG. 10 is a structural diagram showing a conventional bypass circuit which is generally used. In this system, SOC values calculated from voltage values of cells $21a$, $21b$, ... measured by voltage sensors $22a$, $22b$, ... are mutually compared and then, for instance, the cell $21a$ which, in this case, is determined to have a high SOC value is discharged by turning on a bypass switch $23a$ for a certain period of time calculated from the SOC value. In this manner, the disparity of SOC values in each of cells $21a$, $21b$, ... is equalized.

However, in the conventional bypass circuit, voltage sensors $22a$, $22b$, ... must be provided for each of the cells $21a$, $21b$, ... to carry out the equalization of the SOC values of the cells $21a$, $21b$, ... Also, the calculation of the SOC value for each of the cells $21a$, $21b$, ... based on the measured voltage values becomes necessary. Moreover, since it becomes necessary to carry out an ON/OFF control of the bypass switch $23a$, $23b$, ... corresponding to the cell $21a$, $21b$, ... based on the calculated SOC values, the bypass circuit becomes complicated and expensive.

In order to solve the above mentioned problems, for instance, a method for equalizing the disparities in remaining charge of each cell has been proposed in which cells forming the battery are connected in parallel so that electric charge is moved from cells having a large remaining charge to cells having a small remaining charge.

According to the above method, since only a switching element for connecting cells in parallel is necessary and a complicated bypass circuit becomes unnecessary, the system may be constructed at a significantly lower cost than that of the conventional method.

However, in the above-mentioned remaining charge equalizing method, there is a possibility that a large amount of current may flow locally in the battery if the switching element for connecting the cells in parallel is stuck, and this may cause problems such as a deterioration of the battery.

Accordingly, an object of the invention is to provide a charge equalizing device for a power storage unit having a simple structure at a low cost, which is capable of equalizing the disparity of SOC among the cells by selecting a suitable combination of connections among the cells.

Also, another object of the invention is to provide a charge equalizing device for a power storage unit having a simple structure manufacturable at a low cost, which is capable of equalizing the disparity of SOC values among the cells by suitably connecting the cells in parallel, and avoiding the deterioration of the battery by quickly detecting such problems as a stuck state of the switches used for connecting the cells in parallel and preventing the occurrence of overcurrents.

SUMMARY OF THE INVENTION

Accordingly, the present invention provides a charge equalizing device for a power storage unit, which equalizes the remaining charge of each cell unit of the power storage unit that includes a plurality of groups of cells formed by a plurality of the cell units which are connected in series, including: a connection device (the main switch 1 in an embodiment) provided with (for instance, between the group A cells and group B cells in one embodiment) a series connection circuit for the groups of cells, the connection device being capable of connecting and disconnecting the groups of cells; a connection terminal provided for each of the cell units; and a switch device (the cell parallel connection switches 4 in one embodiment) which connects one of the connection terminals of one of the groups of cells to another connection terminal of another group of cells, wherein the switch device is capable of changing the combination of the connection terminals to be connected.

According to the above charge equalizing device, unlike conventional bypass circuit methods in which the equalizing process is carried out by consuming the energy of a cell having a high remaining charge by converting it to heat by using the bypass resistance, the energy is not consumed as heat during the equalizing process and may be efficiently used since the charge is transferred from cells having a high remaining charge to cells having a low remaining charge.

In accordance with another aspect of the invention, the charge equalizing device further includes: an overcurrent blocking device (a fuse 5 in one embodiment) provided with a closed circuit which is formed when the switch device is turned on, the overcurrent blocking device preventing an overcurrent from flowing in the closed circuit.

According to the above charge equalizing device, the generation of an excessive rush current immediately after the switch devices are turned on may be prevented. It is preferable to provide a rush current inhibition resistance for each parallel circuit of the cell units.

Also, the power storage unit including the charge equalizing device of the present invention may be used for an electric vehicle or a hybrid vehicle, and the charge equalizing device equalizes the remaining charges of a plurality of cell units which form the power storage unit (e.g., battery, capacitor, etc.,) by switching on or off a cell parallel connection means after the connection device is disconnected when the ignition is turned off.

The present invention also provides a charge equalizing device for a power storage unit, which equalizes the remaining charge of each cell unit of the power storage unit that includes a plurality of groups of cells formed by a plurality of the cell units which are connected in series, including: a connection device (the main switch 1 in one embodiment) provided with a series connection circuit of the groups of cells (for instance, between the group A cells and the group B cells in one embodiment), the connection device being capable of connecting and disconnecting the groups of cells; a connection terminal provided for each of the cell units; a switch device (the cell parallel connection switches 4 in one embodiment) which connects one of the connection terminals of one of the groups of cells to the other one of the connection terminals of another group of cells; and a control unit (the control unit 20 in an embodiment) which controls the connection of the switch device, wherein the control unit, after disconnecting (i.e., turning off) the connection device and confirming that all of the switch devices have been turned off, starts controlling the switch devices.

According to the above charge equalizing device, problems such as a switch device being stuck may be quickly detected, and the flow of an overcurrent in a part of the power storage unit may be prevented.

In accordance with another aspect of the invention, the control unit is capable of changing the combination of connection terminals to be connected (in one embodiment, the group A parallel connection switches 4*a* and the group B parallel connection switches 4*b* are alternately connected).

In yet another aspect of the invention, the control unit, after turning off the switch device connected at that moment and confirming that all of the switch devices have been turned off, turns on the switch devices.

In this manner, problems such as a switch device being stuck may be quickly detected since the switch device is turned on for a new combination of cell units after confirming that all of the switch devices have been turned off.

In yet another aspect of the invention, the control unit confirms that all of the switch devices have been turned off by confirming that there is no voltage difference between both ends of the power storage unit (in an embodiment, the voltage between the electric power extracting terminals is confirmed to be zero volts).

According to the above charge equalizing device, problems such as a switch device being stuck may be easily detected without providing a complex problem handling function.

In yet another aspect of the invention, the above charge equalizing device further includes: an overcurrent blocking device (a fuse 5 in an embodiment) provided with a closed circuit which is formed when the switch device is turned on, the overcurrent blocking device preventing an overcurrent from flowing in the closed circuit.

According to the above charge equalizing device, the generation of an excessive rush current immediately after the switch devices are turned on may be prevented. It is preferable to provide a rush current inhibition resistance for each parallel circuit of the cell units.

The present invention also provides a method for equalizing the remaining charge of each cell unit of a power storage unit that includes a plurality of groups of cells formed by a plurality of the cell units which are connected in series using the above charge equalizing device including the steps of: disconnecting the connecting device; determining the number of times to repeat turning the switch device on and off based on the difference in voltage between the groups of cells; turning on the switch device to carry out an equalizing process for the cell units connected by the switch device via the respective connection terminal; changing the combination of cell units connected by the switch device and turning on the switch device to carry out an equalizing process for the cell units connected by the switch device via the respective connection terminal; and confirming that the voltage difference between the groups of cells is within a predetermined value.

In accordance with another aspect of the invention, the method further includes the step of: determining whether the switch device has been turned on and off a predetermined number of times.

In yet another aspect of the invention, the method further includes the step of: determining if the voltage of the power storage unit is 0 V.

In yet another aspect of the invention, the method further includes the step of: issuing a notification of system failure if it is determined that the voltage of the power storage unit is not 0 V.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Figure 1:
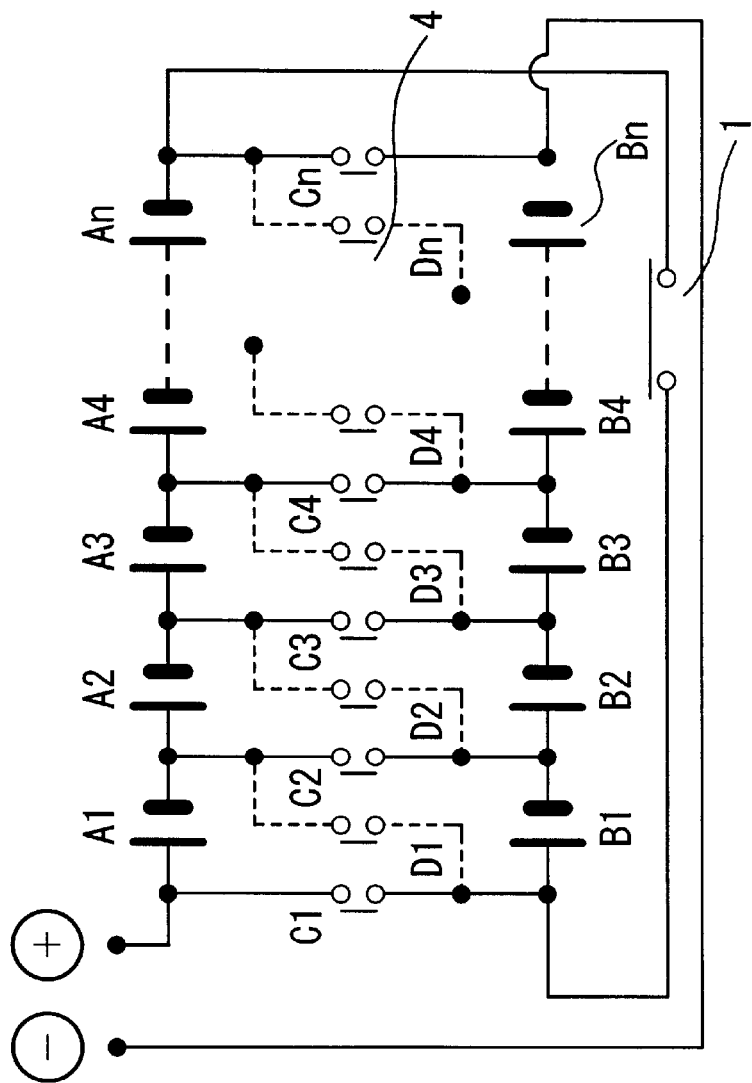
FIG. 1 is a block diagram showing a battery for explaining a charge equalizing device for a power storage unit according to the first embodiment of the present invention.

FIG. 1 is a block diagram showing a battery for explaining a charge equalizing device for a power storage unit according to the first embodiment of the present invention. The battery in this embodiment is constructed of a plurality of cells which are connected in series.

In FIG. 1, the battery is constituted by two sets of cell units. The first set of cell units is constituted by cells A1, A2, A3, . . . An which are connected in series, and the second set of cell units is constituted by cells B1, B2, B3, . . . Bn which are also connected in series. Both the first set and the second set of cell units are connected in series via a main switch 1. That is, the battery may be electrically divided in two sets of cell units via the main switch 1 and a positive terminal and a negative terminal are attached to the respective ends of the cell units connected in series. Note that the main switch 1 is used to ensure safety by shutting off the high voltage circuit of the system connected to the battery when the ignition is turned off.

Also, cell parallel connection switches 4 are provided for connecting the individual cells A1, A2, A3, . . . An contained in the first cell unit to the individual cells B1, B2, B3, . . . Bn contained in the second cell unit in parallel. The parallel connection switches 4 include group A parallel connection switches C1, C2, C3, . . . Cn and group B parallel connection switches D1, D2, D3, . . . Dn. That is, the cell A1 and the cell B1, the cell A2 and the cell B2, . . . and the cell An and the cell Bn, are respectively connected in parallel when the group A parallel connection switches C1, C2, C3, . . . Cn are closed. Also, the cell A2 and the cell B1, the cell A3 and the cell B2, . . . and the cell An and the cell B(n−1), are respectively connected in parallel when the group B parallel connection switches D1, D2, D3, . . . Dn are closed. The above mentioned main switch 1 and the cell parallel connection switches 4 are turned on/off by a control unit (e.g. a computer) which is not shown in the figure.

Next, the operation for equalizing the SOC value of each cell of the battery shown in FIG. 1 will be explained. First, the group A parallel connection switches C1, C2, C3, . . . Cn and the group B parallel connection switches D1, D2, D3, . . . Dn are alternately turned on and off, repeatedly, while the main switch 1 is turned off. When the group A parallel connection switches C1, C2, C3, . . . Cn are closed, the cell A1 and the cell B1, the cell A2 and the cell B2, . . . and the cell An and the cell Bn, are respectively connected in parallel. Accordingly, the SOC values of those cells which are connected in parallel are equalized.

After that, when the group B parallel connection switches D1, D2, D3, . . . Dn are turned on, the cell A2 and the cell B1, the cell A3 and the cell B2, . . . and the cell An and the cell B(n−1), respectively, are connected in parallel. Accordingly, the SOC values of those cells which are connected in parallel are equalized. The disparity equalization process of the SOC values for all of the cells of the battery is carried out by changing the combination of cells among the two sets of cell units and repeating switching the parallel connections by alternately turning on and off the two groups of the parallel connection switches C1–Cn, and D1–Dn while the main switch 1 is turned off.

Figure 2:
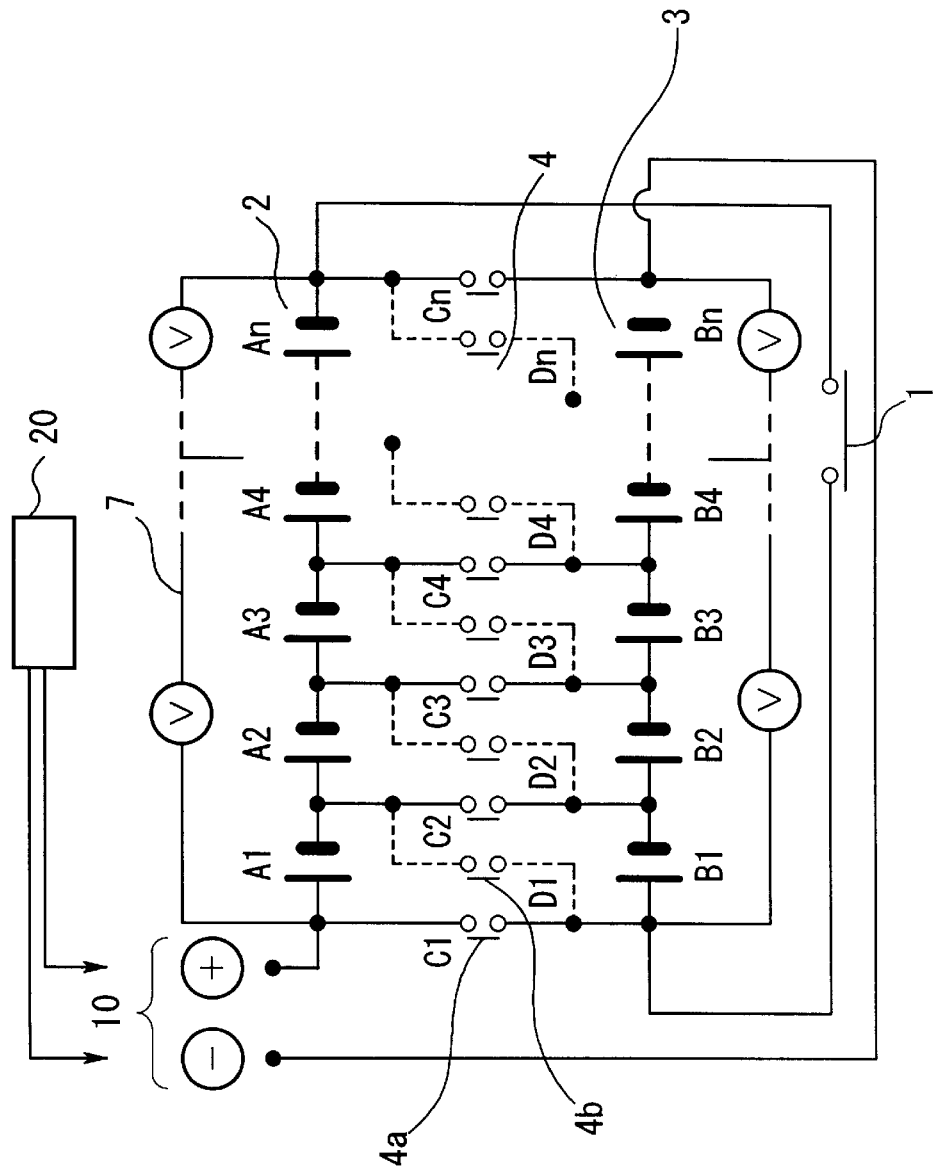
FIG. 2 is a block diagram showing a battery for explaining a charge equalizing device for a power storage unit according to the second embodiment of the present invention.

FIG. 2 is a block diagram showing a battery for explaining a charge equalizing device for a power storage unit according to a second embodiment of the present invention. In FIG. 2, elements which are the same as the ones shown in FIG. 1 are depicted by using the same numerals. The battery in the second embodiment is also constructed of a plurality of cells which are connected in series.

In FIG. 2, the battery is constituted of two sets of cell units, i.e., the group A cell unit 2 and the group B cell unit 3. The group A cell unit 2 is constituted by cells A1, A2, A3, . . . An which are connected in series, and the group B cell unit 3 is constituted by cells B1, B2, B3, . . . Bn which are also connected in series. Both the group A cell unit and the group B cell unit are connected in series via the main switch 1. In the battery system of this embodiment, the main switch 1 may be substantially placed at the midpoint of voltage. The two group cell units are connected in series when the main switch 1 is turned on. Also, electric power extracting terminals 10 (a positive terminal and a negative terminal) are provided so that power may be extracted from the battery.

Moreover, the cell parallel connection switches 4 are provided for connecting the individual cell A1, A2, A3, . . . An in the group A cell unit 2 to the individual cell B1, B2, B3, . . . Bn in the group B cell unit 3 in parallel. The parallel connection switches 4 include group A parallel connection switch 4a (C1, C2, C3, . . . Cn) and group B parallel connection switch 4b (D1, D2, D3, . . . Dn). That is, the cell A1 and the cell B1, the cell A2 and the cell B2, . . . and the cell An and the cell Bn are connected in parallel when the group A parallel connection switch 4a is turned on. Also, the cell A2 and the cell B1, the cell A3 and the cell B2, . . . and the cell An and the cell B(n−1) are connected in parallel when the group B parallel connection switch 4b is turned on. Note that cells located at both ends of the cell units (i.e., the cell A1 and the cell Bn, respectively) are connected in parallel to a cell which belongs to the other group. The above mentioned main switch 1 and the cell parallel connection switches 4 are turned on/off by control unit 20 shown in FIG. 2.

Moreover, a voltage monitoring block 7 for monitoring the voltage of each cell or a set of cells is provided in order to monitor the voltage V of target cell(s). The control unit 20 detects an abnormality in cell voltage by mutually comparing the voltages detected by the voltage monitoring block 7 and uses the detected voltage to equalize disparities in the cell voltages. Also, the number of cells to be tested by the voltage monitoring block 7 is determined based on such factors as cost.

Next, the operation for equalizing the SOC value of each cell of the battery shown in FIG. 2 will be explained.

The control unit 20 alternately turns on and off the group A parallel connection switches C1, C2, C3, . . . Cn and the group B parallel connection switches D1, D2, D3, . . . Dn, repeatedly, while the main switch 1 is turned on. That is, the group A parallel connection switches 4a, which are indicated by the solid lines in FIG. 2, and the group B parallel connection switches 4b, which are indicated by the dotted lines in FIG. 2, are alternately turned on and off, repeatedly.

The control unit 20, after turning off the main switch 1, detects the voltage of the electric power extracting terminals 10 and, if the voltage between the electric power extracting terminals (hereinafter also referred to as terminals) is 0 V, the control unit 20 connects the cell A and the cell B1, the cell A2 and the cell B2, . . . the cell An and the cell Bn in parallel by turning on the group A parallel connection switches C1, C2, C3, . . . Cn, respectively. In this manner, the SOC values of the cells which are connected in parallel are equalized. The control unit 20, after a certain period of time, turns off the group A parallel connection switches C1, C2, C3 . . . Cn. After that the control unit 20 confirms that the voltage between the terminals is 0 V and then turns on the group B parallel connection switches D1, D2, D3, . . . Dn so that the cell A2 and the cell B1, the cell A3 and the cell B2, . . . the cell An and the cell B(n−1) are connected in parallel.

The equalizing process for the disparities in SOC values of the cells that are connected in parallel may be carried out in the above-mentioned manner. The equalizing process for the disparities in SOC values for all of the cells of the battery is carried out and controlled by changing the combination of cells among the two sets of groups of cells by alternately turning on and off the two sets of the group parallel connection switches C1–Cn and D1–Dn while the main switch is turned off, and repeating the switching of the combination of parallel connection of the cells.

Also, since the cell parallel connection switches, which have been turned off, are turned on after the control unit 20 confirms that the voltage between the terminals is 0 V when the combinations of cells are switched by the parallel connection switches, it becomes possible to avoid problems such as deterioration of the battery caused by the generation of an overcurrent.

Figures 3, 4:
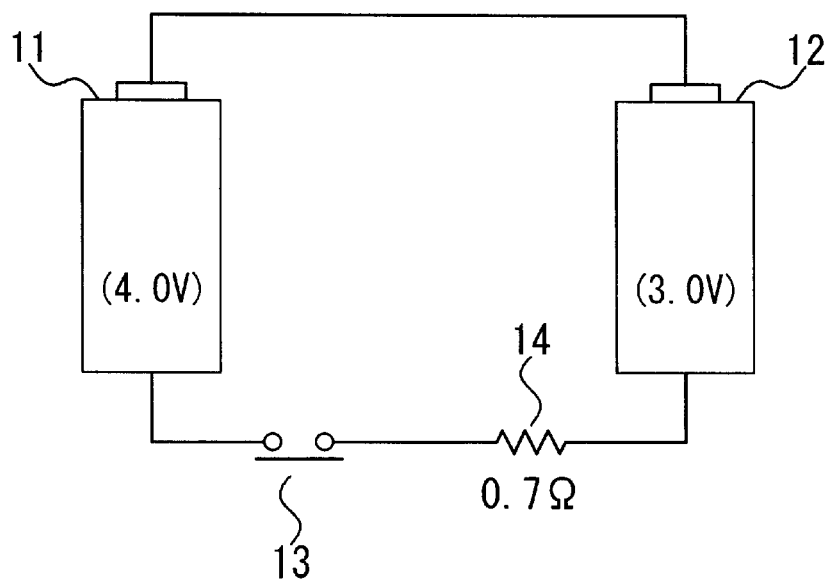
FIG. 3 is a table showing the voltage of the electric power extracting terminals when switches are closed and opened where the voltage of the battery is indicated as PV.
FIG. 4 is a diagram for explaining a basic operation of an SOC equalizing process used in the present invention.

FIG. 3 is a table showing the voltage of the electric power extracting terminals 10 when the above-mentioned switches are turned on and off (where the voltage of the battery is expressed as PV).

As shown in FIG. 3, the voltage between the terminals 10 is 0 V when any of the switches is closed. On the other hand, when any one of the switches is closed, some voltage is generated at the electric power extracting terminals 10. Accordingly, the control unit 20 can confirm that all of the switches are opened by confirming that the voltage between the terminals 10 is 0 V.

Next, the basic operation of the SOC equalizing process according to an embodiment of the present invention will be explained with reference to FIG. 4. In FIG. 4, a high SOC cell 11 having a cell voltage of 4.0 V and a low SOC cell 12 having a cell voltage of 3.0 V are connected in parallel via a switch 13 and a resistance 14 of 0.7 Ω. When the switch 13 is closed, current flows from the high SOC cell 11 to the low SOC cell 12 until the SOC values of the cells 11 and 12 become equal and the SOC values of both are substantially equalized. In this type of equalizing method, it is not necessary to monitor the cell voltage nor calculate the SOC values for the equalizing process.

Figure 10:
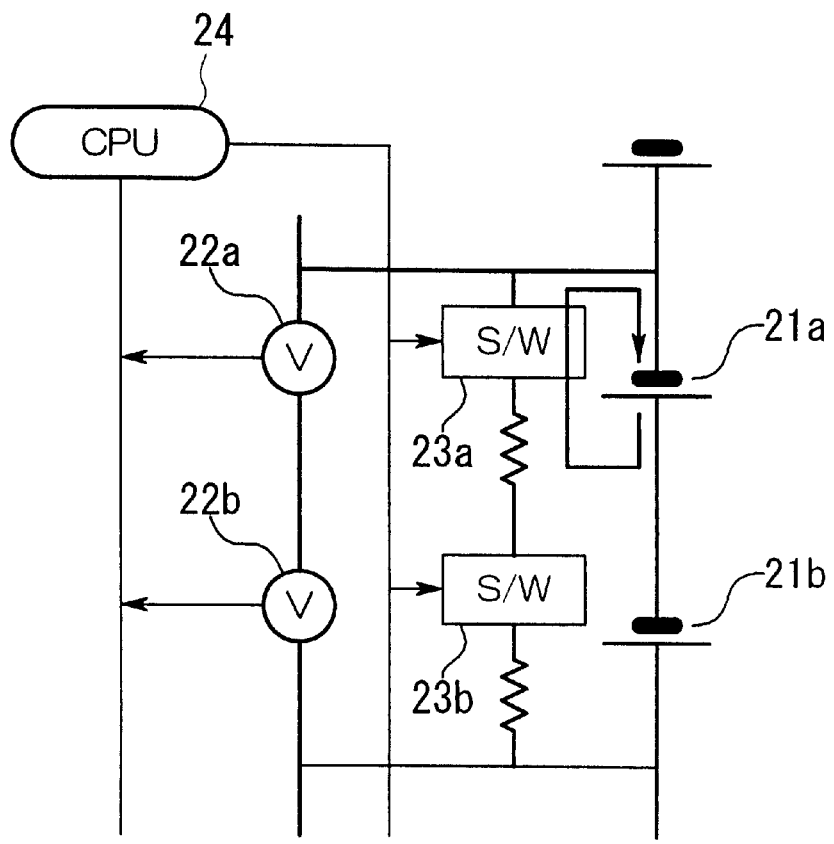
FIG. 10 is a structural diagram showing a conventional bypass circuit which is generally used.

Also, unlike the conventional bypass circuit method shown in FIG. 10, in which the equalizing process is carried out by consuming the energy of the high SOC cell 11 by conversion into heat by using the bypass resistance, the energy is not consumed by conversion into heat during the equalizing process and may be efficiently used according to this type of equalizing process since the charge is transferred from the high SOC cell 11 to the low SOC cell 12.

Figure 5:
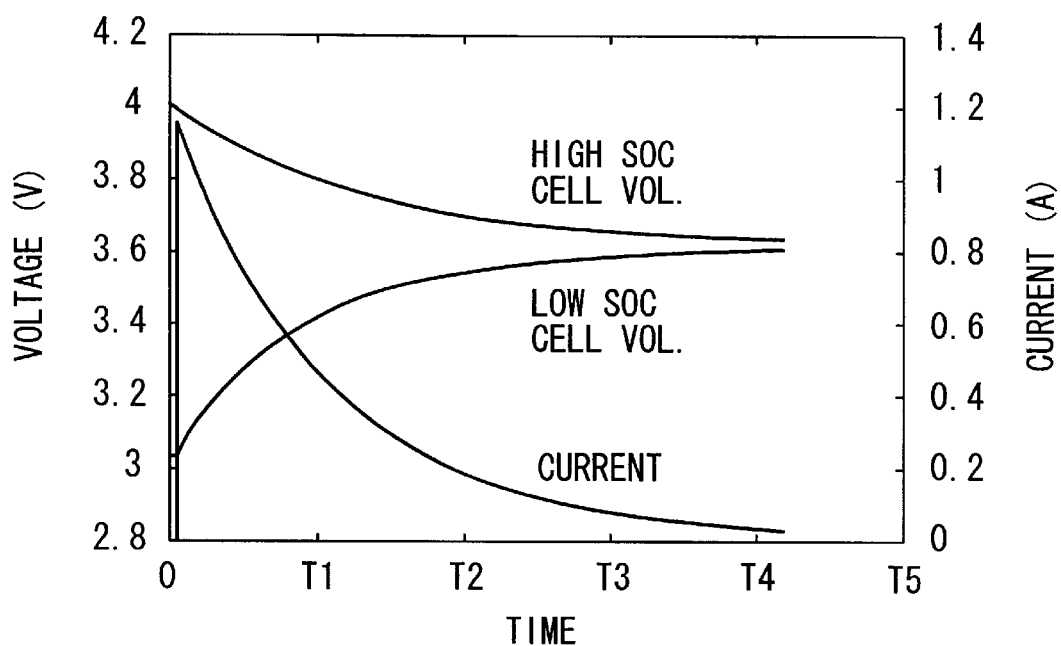
FIG. 5 is a graph showing the characteristics of an SOC equalizing process using the cell parallel connection circuit shown in FIG. 4.

FIG. 5 is a graph showing the characteristics of the SOC equalizing process using the cell parallel connection circuit shown in FIG. 4. In the graph shown in FIG. 5, the time over which current flows through the switch 13 for connecting the cells 11 and 12 in parallel is plotted on the horizontal axis, the cell voltage (V) is plotted on the left vertical axis, and the current (A) which flows between the cells is plotted on the right vertical axis. Since the initial voltage of the low SOC cell 12 is 3 V and that of the high SOC cell 11 is 4 V, a relatively large current (1.2 A) flows from the cell 11 to the cell 12 through the 0.7Ω resistance 14. After that the voltages of cell 11 and cell 12 get closer and both reach about 3.6 V at about time T3 and the equalizing process is almost completed. Also, the charging current which flows from the high SOC cell 11 to the low SOC cell 12 decreases as the voltages of both cells get closer, and reaches 0.1 A or less at about time T3.

Figure 6:
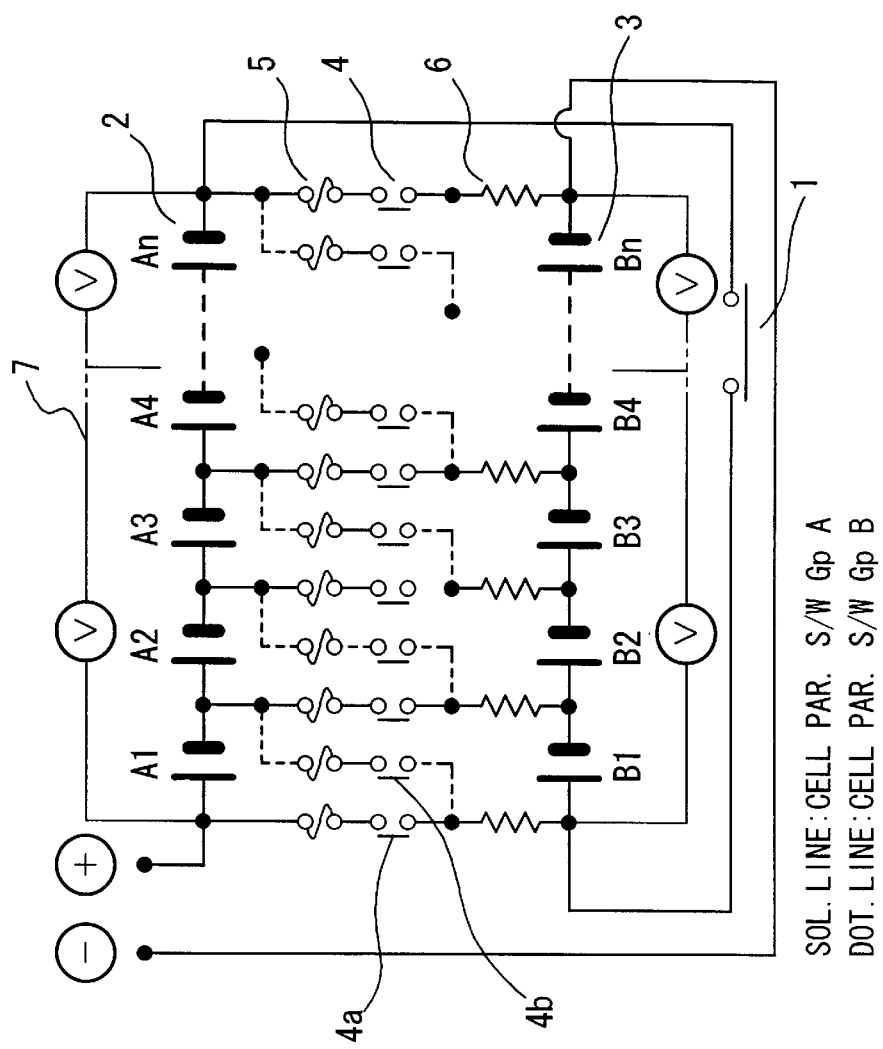
FIG. 6 is a block diagram showing a battery for explaining a charge equalizing device for a power storage unit according to the third embodiment of the present invention

FIG. 6 is a diagram showing a battery in which a plurality of cells which are used for a HEV or EV are connected in series according to an embodiment of the present invention. Since the basic structure of the battery is the same as the one shown in FIG. 1, explanations of the elements which have already been described will be omitted.

In general, a HEV or EV has a main switch 1 which is turned off at the same time as the ignition. In this way, safety may be ensured by shutting off the high voltage circuit of the system which is connected to the positive and negative terminals of the battery when the ignition is turned off. In this battery system, the main switch 1 may be substantially placed at the midpoint of voltage. Accordingly, the main switch is automatically opened when the ignition is turned off, and the battery is electronically divided into two sets of group cells. That is, one set of cells (i.e., the group A cell 2) is formed by a number N of cells A1, A2, . . . An and the other set of the cells (i.e., the group B cell 3) is formed by a number N of cells B1, B2, . . . Bn.

Also, each cell of the group A cell unit 2 and the group B cell unit 3 is connected via the cell parallel connection switches 4, the number of which is expressed as 2N, so that the cells may be connected in parallel to adjacent cells belonging to the other group. Note that the two cells located at both ends of the group A cell unit 2 and the group B cell unit 3 are connected in parallel to a cell belonging to the other group.

Moreover, a fuse 5 for protecting the system from overcurrents is provided in series for each of the cell parallel connection switches 4. Accordingly, the number of the fuses 5 may also be expressed as 2N. Further, a rush current prevention resistor 6 is provided for each parallel circuit (of the cells) in order to prevent the generation of an excessive rush current immediately after the cell parallel connection switches 4 are closed. Accordingly, the number of the rush current prevention resistors 6 is expressed as N.

The cell parallel connection switches 4 are divided into two groups and alternately closed and opened so that one cell of the group A cell unit 2 and another cell in the group B cell unit 3 may be connected in parallel. That is, group A parallel connection switches 4a, which are indicated by solid lines in FIG. 6, and group B parallel connection switches 4b, which are indicated by dotted lines in FIG. 6, are alternately turned on and off. Also, the voltage monitoring blocks 7 for monitoring the voltage of each cell or a set of cells is provided in order to monitor the voltage V of target cell(s). Abnormalities in cell voltages are detected by mutually comparing the voltages detected by the voltage monitoring block 7 and the information on the detected voltages is used to equalize abnormal voltages of the cell. Also, the number of cells to be tested by the voltage monitoring block 7 is determined based on such factors as cost.

Figure 7:
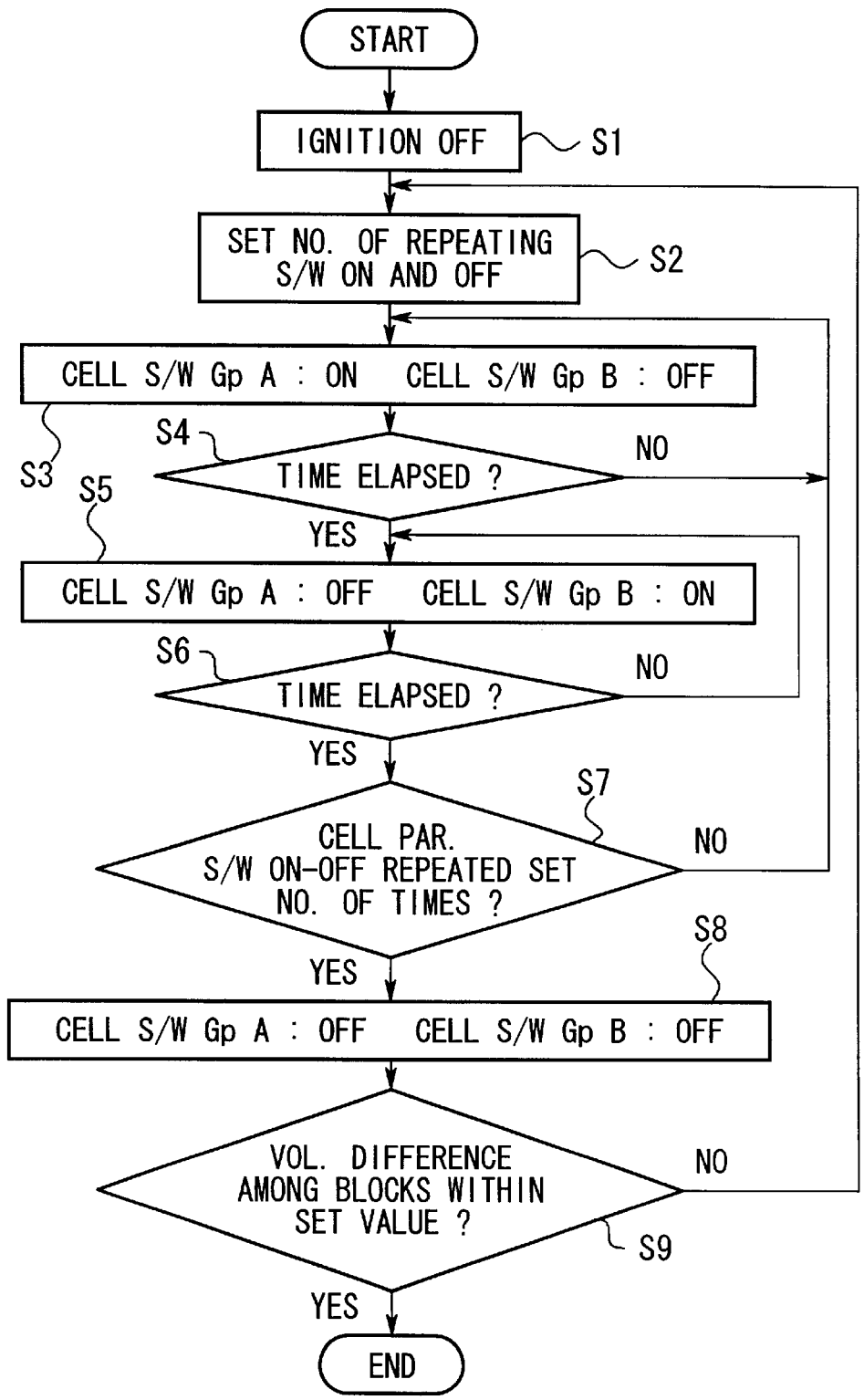
FIG. 7 is a flowchart for explaining each step of an equalizing process according to an embodiment of the disparity equalizing process of the present invention.

FIG. 7 is a flowchart for explaining each step of the equalizing process according to an embodiment of the present invention. Here, the equalizing process will be explained with reference to the battery shown in FIG. 6.

First, in a state in which the ignition has been turned off and, subsequently, the main switch 1 has been opened (step S1), the number of times to repeat the closing and opening of the cell parallel connection switches 4 is set based on the difference in voltage among the voltage monitoring blocks 7 (step S2). The number of times to repeat the closing and opening of the switches 4 is set to be greater as the differences in voltage (V) becomes greater since the equalizing process takes a longer time as the differences in voltage (V) becomes greater.

Then, the group A parallel connection switches 4a are closed and the group B parallel connection switches 4b are opened so that the cell A1 and the cell B1, the cell A2 and the cell B2, . . . the cell An and the cell Bn are connected in parallel and the cells connected in parallel may be equalized (step S3). After that, it is determined if a predetermined period of time has elapsed (step S4) and, if it has not elapsed (step S4, N), the charging mode in step S3 is continued.

On the other hand, if it is determined that the predetermined time has elapsed (step S4, Y), then the group A parallel connection switches 4a are turned off and the group B parallel connection switches 4b are turned on so that the cell A2 and the cell B1, the cell A3 and the cell B2, . . . the cell An and the cell B(n−1) are connected in parallel and the cells connected in parallel may be equalized (step S5). After that it is determined if the predetermined time has elapsed (step S6) and, if it has not been elapsed (step S6, N), the charging mode in step S5 is continued.

On the other hand, if it is determined that the predetermined time has elapsed in step S6 (step S6, Y), then it is determined if the cell parallel connection switches 4 have been repeatedly turned on and off the number of times determined in step S2 (step S7). If the cell parallel connection switch 4 has not been turned on and off the predetermined number of times (step S7, N), then the process returns to step S2 and repeats the above-mentioned steps.

On the other hand, if it is determined that the cell parallel connection switches 4 have been turned on and off for the predetermined number of times (step S7, Y), both the group A parallel connection switches 4a and the group B parallel connection switches 4b are turned off (step S8) and it is determined if the difference in voltage among all of the voltage monitoring blocks 7 is within a predetermined value (step S9). If there is a voltage monitoring block 7 whose voltage is difference from the other blocks 2 exceeding the predetermined value (step S9), then the process returns to step S2 and repeats the above-mentioned steps. If the voltage of all the monitoring blocks 7 is within the predetermined value (step S9, Y), then terminates the equalizing process for the cells.

As mentioned above, the equalizing process for all of the cells is carried out by alternately turning on and off the group A parallel connection switches 4a and the group B parallel connection switches 4b repeatedly over a predetermined period of time, for a predetermined number of times, depending on the difference in voltage measured by each of the voltage monitoring blocks 7.

After repeating the turning on and off of the cell parallel connection switches 4 for a predetermined number of times, if it is determined that the voltage difference among each of the voltage monitoring blocks 7 is greater than a predetermined value (for instance, 1V), the group A parallel connection switches 4a and the group B parallel connection switches 4b are again turned on and off repeatedly to carry out an additional control operation. Also, if the voltage difference among the voltage monitoring blocks 7 increases during the above cell equalizing process, this interpreted as a system failure and the equalizing operation is stopped. A notification of the failure may be issued to the driver by, for instance, lighting an alarm light the next time the ignition is turned on.

Figure 8:
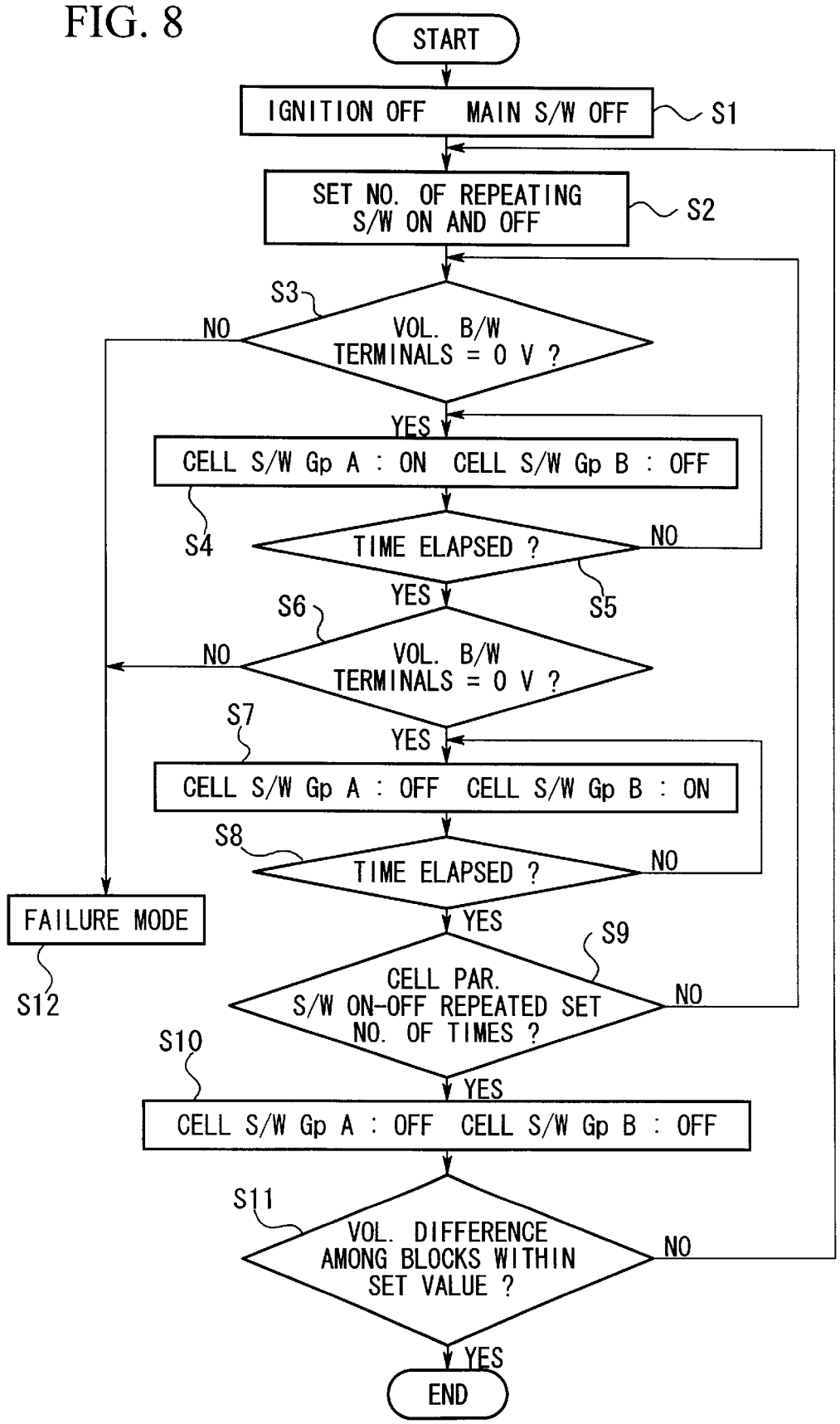
FIG. 8 is a flowchart for explaining each step of an equalizing process according to another embodiment of the disparity equalizing process for HEV or EV using the disparity equalizing device for a power storage unit of the invention.

Next, another embodiment of the disparity equalizing process for HEV or EV using the disparity equalizing device for a power storage unit of an embodiment of the present invention will be explained with reference to FIG. 8. Note that the following control operation is performed by the control unit 20 which carries out a predetermined program.

First, when the ignition is turned off, the main switch 1 is immediately turned off (step S1). Then, in step S2, the number of times the cell parallel connection switches 4 should be closed and opened is determined based on the voltage difference detected by the voltage monitoring blocks 7. The number of times to repeat the turning on and off of the switches 4 is set to be greater as the differences in voltage (V) become greater since the equalizing process takes a longer time as the differences in voltage (V) become greater.

Then, in step S3, it is determined if the voltage difference between the electric power extracting terminals is 0 V If it is determined that the voltage difference between the terminals is 0 V, then the process proceeds to step S4 and only the group A parallel connection switches 4a are turned on while the group B parallel connection switches 4b are turned off. In this manner, the cell A1 and the cell B1, the cell A2 and the cell B2, . . . the cell An and the cell Bn are connected in parallel to carry out the equalizing process for the cells connected in parallel.

Next, in step S5, it is determined if a predetermined period of time has elapsed. If it is determined that the predetermined period of time has not elapsed, the process goes back and forth between steps S4 and S5. Accordingly, the switching state of step S4 is maintained until the predetermined period of time has elapsed.

If it is determined that the predetermined period of time has elapsed in step S5, then the group A parallel connection switches 4a are turned off, and it is determined, in step S6, if the voltage between the terminals is 0 V. If it is determined that the voltage between the terminals is 0 V, then the process proceeds to step S7 and the group B parallel connection switches 4b are closed. In this manner the cell A2 and the cell B1, the cell A3 and the cell B2, . . . the cell An and the cell B(n−1) are connected in parallel and the cells connected in parallel are equalized. After that, in step S8, it is determined if the predetermined period of time has elapsed. If it is determined that the predetermined period of time has not elapsed, the process goes back and forth between steps 7 and 8, and maintains the current switching state until the predetermined period of time has elapsed.

If it is determined that the predetermined period of time has elapsed in step S8, the process proceeds to step S9 and it is determined if the cell parallel connection switches 4 have been closed and opened repeatedly for the number of times determined in step S2.

If it is determined that the cell parallel connection switches 4 have not been closed and opened for the predetermined number of times, the process returns to step S3 and repeats the above-mentioned steps.

On the other hand, in step S9, if it is determined that the cell parallel connection switches 4 have been turned on and off for the predetermined number of times, the process proceeds to step S 10 and turns off both the group A parallel connection switches 4a and the group B parallel connection switches 4b. In the subsequent step S 11, it is determined if the voltage difference among all of the voltage monitoring blocks 7 is within a predetermined value. If there is a voltage monitoring block 7 whose voltage differs from the other blocks 7 exceeding the predetermined value, then the process returns to step S2, resets the number of times to repeat the closing and opening the cell parallel connection switches based on the current voltage difference between the blocks, and carries out the above-mentioned steps again. On the other hand, if it is determined that the voltage difference among all of the voltage monitoring blocks 7 is within the predetermined value, then the equalizing process for the cells is terminated.

If the voltage between the terminals is not 0 V in the above-mentioned steps S3 and S6, then the process proceeds to step S12 and this is interpreted as a system failure. Accordingly, the equalizing operation is stopped and the operations for turning on the main switch 1 and the cell parallel connection switches 4 are prohibited. Also, a notification of the system failure may be issued to the driver by, for instance, lighting an alarm light the next time the ignition is turned on.

As mentioned above, the equalizing process for all of the cells is carried out by alternately turning on and off the group A parallel connection switches 4a and the group B parallel connection switches 4b repeatedly over a predetermined period of time, for a predetermined number of times, depending on the difference in voltage measured by each voltage monitoring block 7.

Also, after repeating the operations of closing and opening of the cell parallel connection switches 4 for a predetermined number of times, if the voltage difference among each of the voltage monitoring blocks 7 is greater than a predetermined value (for instance, 1V), the group A parallel connection switches 4a and the group B parallel connection switches 4b are again turned on and off repeatedly to carry out an additional control operation. Moreover, if the voltage difference among the voltage monitoring blocks 7 increases during the above cell equalizing process, this is interpreted as a system failure and the equalizing operation is stopped. A notification of this system failure may be issued to the driver by, for instance, lighting an alarm light the next time the ignition is turned on.

Figure 9:
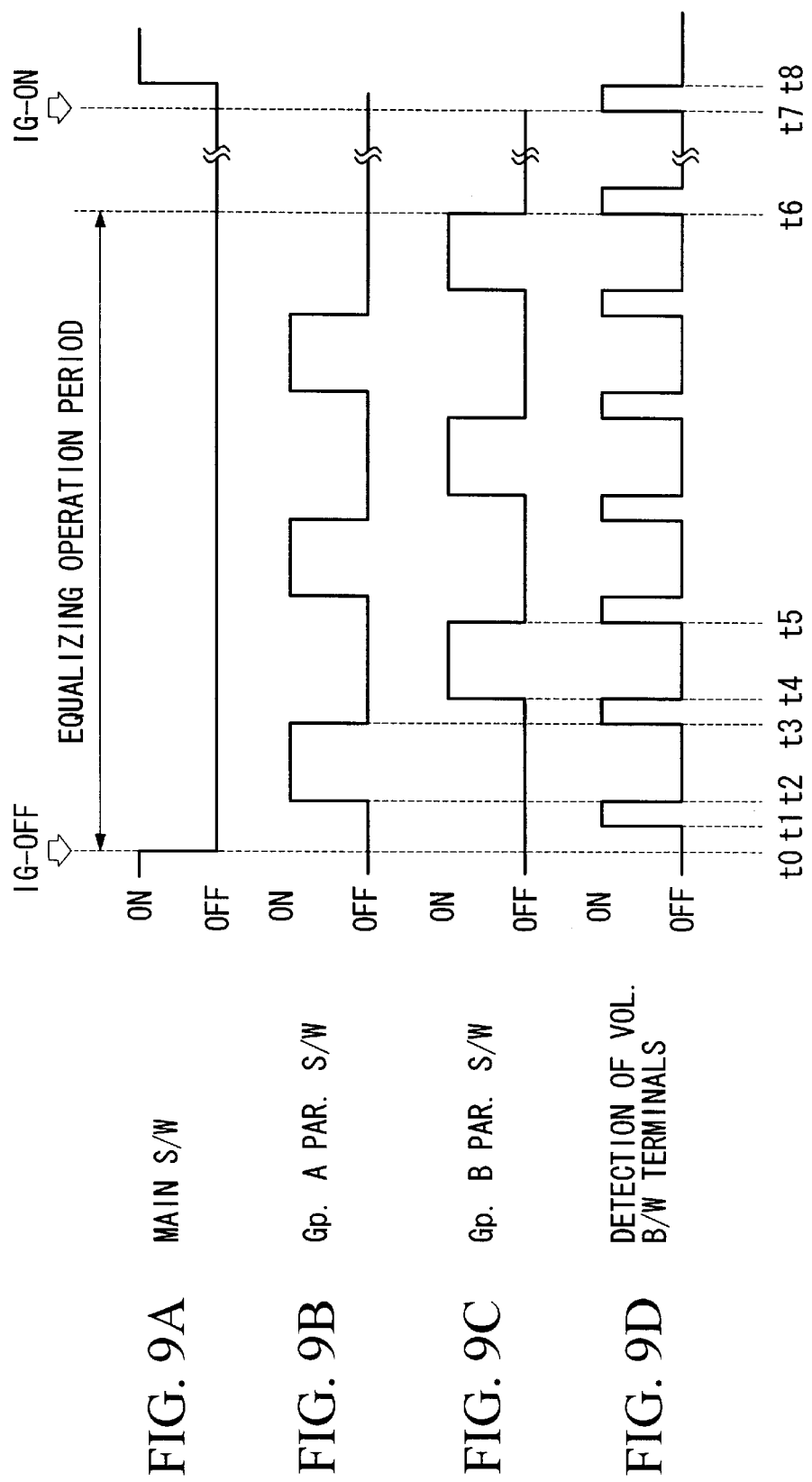
FIG. 9A is a graph showing the timing for closing and opening the main switch.
FIG. 9B is a graph showing the timing for closing and opening the group A parallel connection switches.
FIG. 9C is a graph showing the timing for closing and opening the group B parallel connection switches.
FIG. 9D is a graph showing the timing for detecting the voltage between the electric power extracting terminals.

FIGS. 9A–9D are timing charts showing the closing/opening timing of each switch when the above-mentioned process is carried out and the timing for detecting the voltage of the electric power extracting terminals 10. FIG. 9A shows the timing for closing/opening the main switch 1. FIG. 9B shows the timing for closing/opening the group A parallel connection switches 4a. FIG. 9C shows the timing for closing/opening the group B parallel connection switches 4b. FIG. 9D shows the timing for detecting the voltage between the electric power extracting terminals.

In FIGS. 9A–9D, when the main switch 1 turned off at time t0, it is detected if the voltage between the terminals is 0 V at time t1. After that, if it is determined that the voltage between the terminals is 0 V, the group A parallel connection switches 4a are turned on at time t2. The closed state of the group A parallel connection switches 4a is maintained for a predetermined period of time and then turned off at time t3. At the same time, the voltage between the terminals is detected and it is determined if all of the switches are in their off state. If it is determined that the voltage between the terminals is 0 V, the group B parallel connection switches 4b are turned on at time t4.

The closed state of the group B parallel connection switches 4b is maintained for a predetermined period of time and then turned off at time t5. At the same time, the voltage between the terminals is detected. This switching operation of the cell parallel connection switches is carried out a predetermined number of times and, if it is determined that the remaining charges of each cell are equalized, the equalizing process is terminated at time t6.

After that when the ignition is turned on at time t7, the voltage between the terminals is detected at the same time and, if it is confirmed that all of the switches are in their open state, the main switch 1 is turned on at time t8.

As mentioned above, since each switch is turned on after confirming that all of the switches are turned off, it is easily detected if a problem has occurred, such as a switch device being stuck, and the flow of an overcurrent may be prevented.

Having thus described example embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A charge equalizing device which equalizes a remaining charge of each cell unit of groups of cells formed by a plurality of the cell units which are connected in series, said groups of cells being negative terminal side group of cells and positive terminal side group of cells, said charge equalizing device comprising:

a connection device which is capable of connecting and disconnecting the groups of cells;

a connection terminal provided for each of the cell units; and a switch device which connects the connection terminal of one of the cell units of the positive terminal side group of cells to the connection terminal of one of the cell units of the negative terminal side group of cells, wherein combination of the connection terminals to be connected is changed in a process of equalizing the remaining charge of each of the cell units.

2. A charge equalizing device according to claim 1, further comprising:

an overcurrent blocking device provided with a closed circuit which is formed when the switch device is turned on, the overcurrent blocking device preventing an overcurrent from flowing in the closed circuit.

3. A charge equalizing device for a power storage unit according to claim 1, further comprising:

a control unit which controls the connection of the switch device, wherein the control unit, after disconnecting the connection device and confirming that all of the switch devices have been turned off, starts controlling the switch device.

4. A charge equalizing device according to claim 3, wherein the control unit is capable of changing the combination of the connection terminals to be connected.

5. A charge equalizing device according to claim 4, wherein the control unit, after turning off the switch device and confirming that all of the switch devices have been turned off, starts operations for turning on the switch devices.

6. A charge equalizing device according to claim 3, wherein the control unit confirms that all of the switch devices have been turned off by confirming that there is no voltage difference between both terminals of the power storage unit.

7. A charge equalizing device according to claim 5, wherein the control unit confirms that all of the switch devices have been turned off by confirming that there is no voltage difference between both terminals of the power storage unit.

8. A charge equalizing device according to claim 3, further comprising:

an overcurrent blocking device provided with a closed circuit which is formed when the switch device is turned on, and the overcurrent blocking device prevents an overcurrent from flowing in the closed circuit.

9. A charge equalizing device according to claim 7, further comprising:

an overcurrent blocking device provided with a closed circuit which is formed when the switch device is turned on, and the overcurrent blocking device prevents an overcurrent from flowing in the closed circuit.

10. A method for equalizing a remaining charge of each cell unit of a power storage unit that includes a plurality of groups of cells formed by a plurality of the cell units which are connected in series using the charge equalizing device claimed in claim 1, comprising the steps of:

disconnecting the connecting device;

determining the number of times of to repeat turning on and off of the switch device based on a difference in voltage among the groups of cells;

turning on the switch device to carry out an equalizing process for the cell units connected by the switch device via the respective connection terminal;

changing the combination of cell units connected by the switch device and turning on the switch device to carry out an equalizing process for the cell units connected by the switch device via the respective connection terminals; and confirming that the difference in voltage between the groups of cells is within a predetermined value.

11. A method for equalizing a remaining charge of each cell unit of a power storage unit according to claim 10, further comprising the step of:

determining whether the switch device has been turned on and off a predetermined number of times.

12. A method for equalizing a remaining charge of each cell unit of a power storage unit according to claim 10, further comprising the step of:

determining if the voltage of the power storage unit is 0 V.

13. A method for equalizing a remaining charge of each cell unit of a power storage unit according to claim 12, further comprising the step of:

issuing a notification of system failure if it is determined that the voltage of the power storage unit is not 0 V.

* * * * *